(12) United States Patent
Son et al.

(10) Patent No.: US 11,535,298 B2
(45) Date of Patent: Dec. 27, 2022

(54) SIDE SILL RIGIDITY REINFORCEMENT STRUCTURE FOR VEHICLE

(71) Applicants: HYUNDAI MOTOR COMPANY, Seoul (KR); KIA MOTORS CORPORATION, Seoul (KR)

(72) Inventors: Kyung-Hoon Son, Suwon-si (KR); Dae-Myoung Park, Suwon-si (KR); Seung-Woo Han, Hwaseong-si (KR); Chang-Sup Hwang, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 57 days.

(21) Appl. No.: 17/155,414

(22) Filed: Jan. 22, 2021

(65) Prior Publication Data

US 2022/0041219 A1  Feb. 10, 2022

(30) Foreign Application Priority Data

Aug. 4, 2020 (KR) .................. 10-2020-0097318

(51) Int. Cl.
*B60J 7/00* (2006.01)
*B62D 25/02* (2006.01)
*B62D 29/00* (2006.01)
*B62D 21/15* (2006.01)

(52) U.S. Cl.
CPC ......... *B62D 25/025* (2013.01); *B62D 21/157* (2013.01); *B62D 29/002* (2013.01)

(58) Field of Classification Search
CPC .. B62D 25/025; B62D 25/04; B62D 25/2036; B62D 21/157; B62D 25/02; B61D 7/00; E21D 23/0409; Y02P 70/50
See application file for complete search history.

(56) References Cited

U.S. PATENT DOCUMENTS

| | | | |
|---|---|---|---|
| 8,491,047 B1 * | 7/2013 | Moll .................. | B62D 25/04 296/193.06 |
| 8,662,575 B2 * | 3/2014 | Tamura .............. | B62D 25/04 296/209 |
| 8,720,984 B2 * | 5/2014 | Kurogi .............. | B62D 25/025 296/205 |
| 9,045,175 B2 | 6/2015 | Mori | |

(Continued)

FOREIGN PATENT DOCUMENTS

| | | |
|---|---|---|
| DE | 102018207221 A1 * | 11/2019 |
| JP | 2012-30746 A | 2/2012 |
| KR | 20-1997-0051616 U | 9/1997 |

*Primary Examiner* — Kiran B Patel
(74) *Attorney, Agent, or Firm* — Lempia Summerfield Katz LLC

(57) ABSTRACT

A side sill rigidity reinforcement structure for a vehicle is mounted an inside surface of a side sill of the vehicle, thereby improving rigidity against side collision. the side sill rigidity reinforcement structure includes: a side sill inner 11, a side sill outer 12 disposed outside the side sill inner 11 and bonded to the side sill inner 11, and a side sill reinforcement member 20 installed in a space between the side sill inner 11 and the side sill outer 12. In particular, the side sill reinforcement member 20 has a plurality of portions each having a closed section formed to penetrate in the width direction of the vehicle, and the portions are repeatedly formed in the longitudinal direction of the vehicle.

17 Claims, 16 Drawing Sheets

(56) References Cited

U.S. PATENT DOCUMENTS

| | | | |
|---|---|---|---|
| 9,493,190 B1* | 11/2016 | Alwan | B62D 25/025 |
| 9,725,118 B2 | 8/2017 | Alwan et al. | |
| 9,963,172 B2* | 5/2018 | Iyoshi | B62D 25/025 |
| 10,118,254 B2* | 11/2018 | Sakai | B23K 11/115 |
| 10,293,862 B1* | 5/2019 | Patel | B62D 21/15 |
| 10,730,560 B2* | 8/2020 | Leblanc | B62D 27/02 |
| 10,899,392 B2* | 1/2021 | Min | B62D 25/025 |
| 11,235,644 B2* | 2/2022 | Kaiki | B62D 25/04 |
| 2012/0306239 A1 | 12/2012 | Tamura et al. | |
| 2017/0080980 A1* | 3/2017 | Alwan | B62D 21/157 |
| 2020/0148277 A1* | 5/2020 | Leblanc | B62D 25/025 |
| 2021/0179180 A1* | 6/2021 | Lee | B62D 25/025 |

* cited by examiner

SIDE SILL RIGIDITY REINFORCEMENT STRUCTURE FOR VEHICLE

CROSS-REFERENCE TO RELATED APPLICATION

This application claims priority to and the benefit of Korean Patent Application No. 10-2020-0097318, filed on Aug. 4, 2020, the entire contents of which are incorporated herein by reference.

FIELD

The present disclosure relates to a side sill rigidity reinforcement structure for a vehicle to improve rigidity against side collision.

BACKGROUND

The statements in this section merely provide background information related to the present disclosure and may not constitute prior art.

A side sill is formed below the side surface of a vehicle to form a structure of the lower portion of the side surface thereof.

As illustrated in FIG. 1, a conventional side sill 110 is formed by bonding a side sill inner 111 convex to the inside of a vehicle and the upper end and lower end of a side sill outer 112 convex to the outside of the vehicle. However, since the side sill 110 separately has no structure of reinforcing rigidity, a collision portion is largely deformed if a shocking force is applied thereto by side collision.

Recently, eco-friendly vehicles such as a hybrid vehicle and an electric vehicle are increasingly supplied, and in order to increase a traveling distance by the charged power, the capacity of a high voltage battery 140 to be mounted is required to be increased. To this end, the high voltage battery 140 advantageous to secure a space may be mounted below a center floor panel 131.

However, the conventional side sill 110 has the side sill inner 111 and the side sill outer 112 simply coupled to each other, and has no separate reinforcement member.

Therefore, upon side collision, there are problems in that the passenger's injury increases by the deformation of the side sill 110, and the high voltage battery 140 gets hit, thereby breaking the high voltage battery 140, and the breakage of the high voltage battery 140 may also cause fire.

Meanwhile, in order to alleviate the above problems, as illustrated in FIG. 2, the side sill 110 has an extrusion member 125 made of an aluminum material inserted therein, thereby improving side rigidity. The extrusion member 125 has a partition wall formed inside the cross section thereof, thereby improving rigidity. However, the extrusion member 125 is made of an expensive aluminum alloy, thereby increasing the manufacturing cost of a vehicle.

FIGS. 3 to 6 illustrate other examples according to the related art. A side sill reinforcement member 120 formed by bonding a plurality of reinforcement members 121, 122, 123, 124 made of a steel material processed by a press by welding is provided between the side sill inner 111 and the side sill outer 112 configuring the side sill 110.

The side sill reinforcement member 120 has a cross-sectional structure obtained by bending a first reinforcement member 121 to a fourth reinforcement member 124 by a press, and has an integral structure by bonding the first reinforcement member 121 to the fourth reinforcement member 124 by welding. The first reinforcement member 121 to the fourth reinforcement member 124 are formed such that the respective cross sections thereof are bent in a width direction of a vehicle, and the respective cross sections thereof are constantly formed in a longitudinal direction of a vehicle.

However, the side sill 110 to which the side sill reinforcement member 120 is applied is disadvantageous for support performance against the side collision of a vehicle because there are many cross-sectional deformations, compared to the side sill 110 to which the aluminum extrusion member 125 is applied.

In addition, the plurality of reinforcement members 121, 122, 123, 124 made of a steel material are bonded by welding, and a plurality of brackets 126 is needed to mount the side sill reinforcement member 120 inside the side sill 110, such that the weight is significantly increased, and the number of components is also increased.

In addition, only the side sill 110 and a seat cross member 132 are welded, and the side sill reinforcement member 120 is not directly connected to the seat cross member 132 or a center floor panel 131, thereby causing structural disconnection (see a region marked by a dotted line in FIG. 5). Therefore, upon side collision, there occurs a phenomenon in which the cross section is spread by the shocking force, thereby not sufficiently preventing the deformation of the side sill 110, the passenger's injury, and the breakage of the high voltage battery 140.

The contents described in Description of Related Art are to help the understanding of the background of the present disclosure, and may include what is not previously known to those skilled in the art to which the present disclosure pertains.

SUMMARY

The present disclosure provides a side sill rigidity reinforcement structure for a vehicle, which may improve rigidity against side collision, thereby reducing or minimizing deformation upon side collision of a vehicle, in order to prevent the breakage of a high voltage battery mounted inside a vehicle.

In one form of the present disclosure, a side sill rigidity reinforcement structure for a vehicle includes: a side sill inner; a side sill outer disposed outside the side sill inner and bonded to the side sill inner; and a side sill reinforcement member installed in a space between the side sill inner and the side sill outer, in which the side sill reinforcement member has a plurality of portions each having a closed section formed to penetrate in the width direction of the vehicle, and the portions are repeatedly formed in the longitudinal direction of the vehicle.

In another form, the side sill reinforcement member includes: an upper reinforcement member bonded to at least any one of the inside surface of the upper surface portion of the side sill inner and the inside surface of the upper surface portion of the side sill outer, and a lower reinforcement member bonded to at least any one of the inside surface of the lower surface portion of the side sill inner and the inside surface of the lower surface portion of the side sill outer, and the upper reinforcement member and the lower reinforcement member are bonded at intervals therebetween to have the closed section formed to penetrate in the width direction of the vehicle.

In other form, the side sill reinforcement member includes: an upper reinforcement member formed with a plurality of upper side sill bonding portions at intervals therebetween, the upper side sill bonding portion convexly formed to be bonded to at least any one of the inside of the upper surface portion of the side sill inner and the inside of the upper surface portion of the side sill outer, and a lower reinforcement member formed with a plurality of lower side sill bonding portions at intervals therebetween, and bonded to the upper reinforcement member, the lower side sill bonding portion concavely formed to be bonded to at least any one of the inside of the lower surface portion of the side sill inner and the inside of the lower surface portion of the side sill outer.

The upper reinforcement member is formed with a lower end bonding portion formed lower than the upper side sill bonding portion between the upper side sill bonding portions adjacent to each other, the lower reinforcement member is formed with an upper end bonding portion formed higher than the lower side sill bonding portion between the lower side sill bonding portions adjacent to each other and bonded to the lower end bonding portion, the lower end bonding portion is formed alternately with the upper side sill bonding portion in the upper reinforcement member, and the upper end bonding portion is formed alternately with the lower side sill bonding portion in the lower reinforcement member.

The lower side sill bonding portion is located to be spaced apart from the lower portion of the upper side sill bonding portion.

A strength reinforcement groove formed at a predetermined depth in the width direction of the vehicle is formed in at least any one of the plurality of upper side sill bonding portions.

A connection portion for connecting the upper side sill bonding portion to the lower end bonding portion is formed in the upper reinforcement member, and another connection portion for connecting the lower side sill bonding portion to the upper end bonding portion is formed in the lower reinforcement member.

The connection portion of the upper reinforcement member and the connection portion of the lower reinforcement member are obliquely formed.

A region surrounded by the upper side sill bonding portion of the upper reinforcement member, the connection portion of the upper reinforcement member, the lower side sill bonding portion of the lower reinforcement member, and the connection portion of the lower reinforcement member is formed in a cylindrical shape penetrating in the width direction of the vehicle.

The upper side sill bonding portion is formed to be inclined upward by a predetermined distance from the end adjacent to the widthwise outside of the vehicle, and after the predetermined distance, formed to be inclined downward.

The lower side sill bonding portion is formed to be stepped so that a portion adjacent to the widthwise outside of the vehicle is formed higher than a portion adjacent to the widthwise inside of the vehicle.

The upper side sill bonding portion is bonded to the inside of the upper surface of the side sill inner by welding, and the lower side sill bonding portion is bonded to the inside of the lower surface of the side sill inner by welding.

A portion in which the upper side sill bonding portion is welded to the inside of the upper surface of the side sill inner is welded together with the end of a seat cross member.

The side sill rigidity reinforcement structure for a vehicle further includes: a bracket installed to connect two upper side sill bonding portions adjacent to each other, and a foaming member provided on the upper surface of the bracket.

The bracket is installed to connect the two upper side sill bonding portions with a strength reinforcement groove formed at a predetermined depth in the width direction of the vehicle interposed therebetween to the upper side sill bonding portion.

A plurality of brackets are installed in the longitudinal direction of the upper reinforcement member.

The bracket is installed on the upper side sill bonding portion in the portion located below the upper surface portion of the side sill outer in the upper side sill bonding portion.

The foaming member is foamed by heating to fill a gap between the upper side sill bonding portion and the inside surface of the side sill outer.

The upper reinforcement member and the lower reinforcement member are manufactured by processing a steel material by hot stamping.

Meanwhile, a side sill rigidity reinforcement structure for a vehicle includes: a side sill inner; a seat cross member having the end welded to the outside surface of the side sill inner; and the side sill reinforcement member welded to the inside surface of the side sill inner, in which the side sill inner, the seat cross member, and the side sill reinforcement member may be simultaneously welded at the same portions.

The side sill rigidity reinforcement structure for a vehicle according to the present disclosure having the above configuration may reduce the deformation of the side sill against the shocking force by the side collision of the vehicle, thereby reducing the passenger's injury, and reducing the breakage of the high voltage battery mounted below the center floor panel upon side collision. The breakage of the high voltage battery is reduced, thereby reducing the possibility of the fire due to the damage to the high voltage battery.

In addition, the number of components of the side sill reinforcement member is reduced, and the separate component for mounting the side sill reinforcement member such as a bracket is unnecessary, thereby reducing the number of components and reducing the weight and the cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
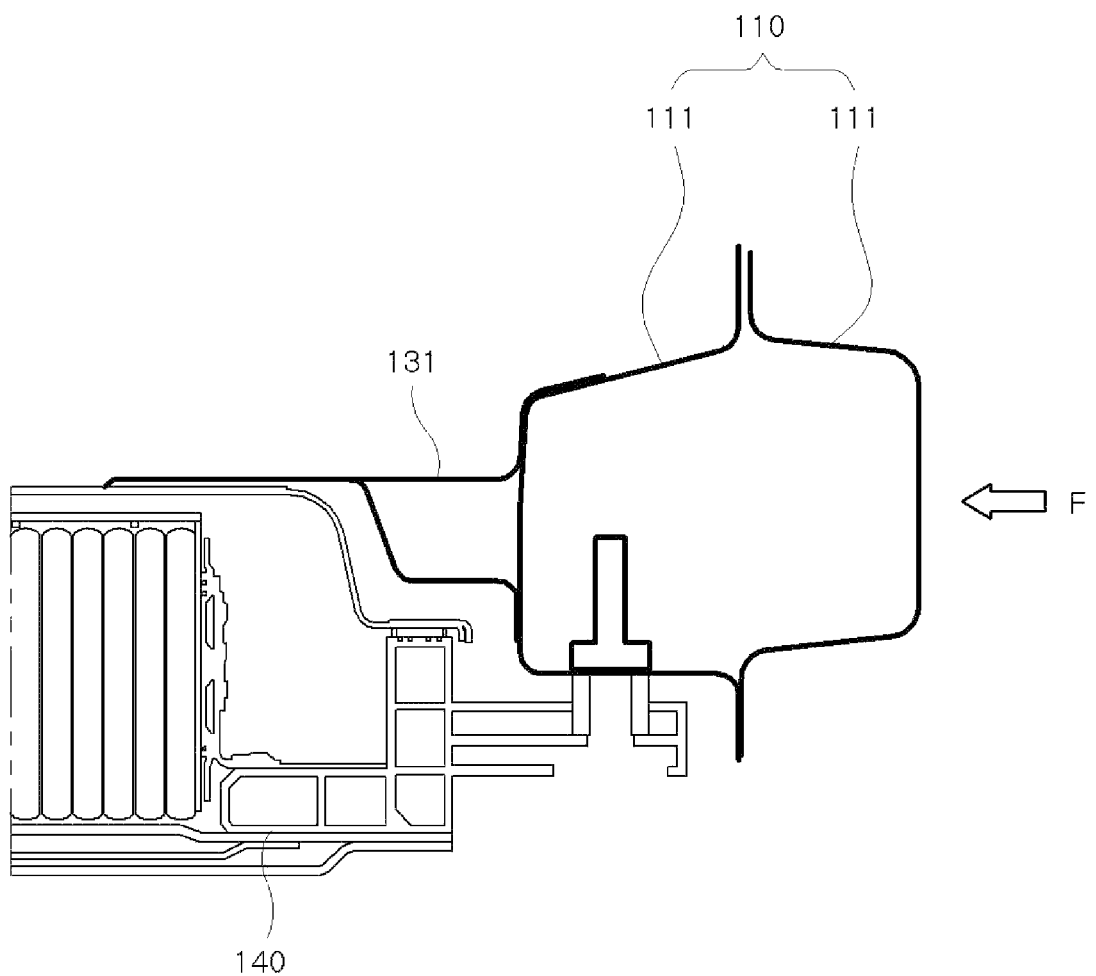
FIG. 1 is a cross-sectional diagram illustrating a portion on which a side sill according to an example of the related art is mounted.
Figure 2:
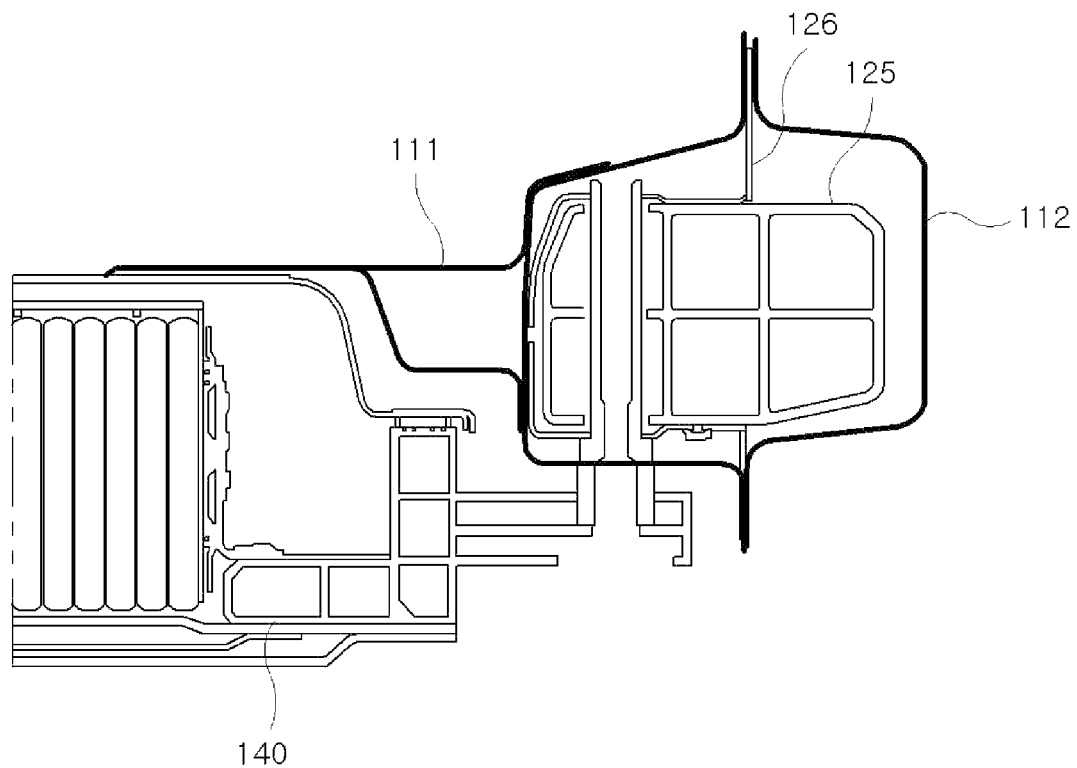
FIG. 2 is a cross-sectional diagram illustrating a portion on which a side sill according to another example of the related art is mounted.
Figure 3:
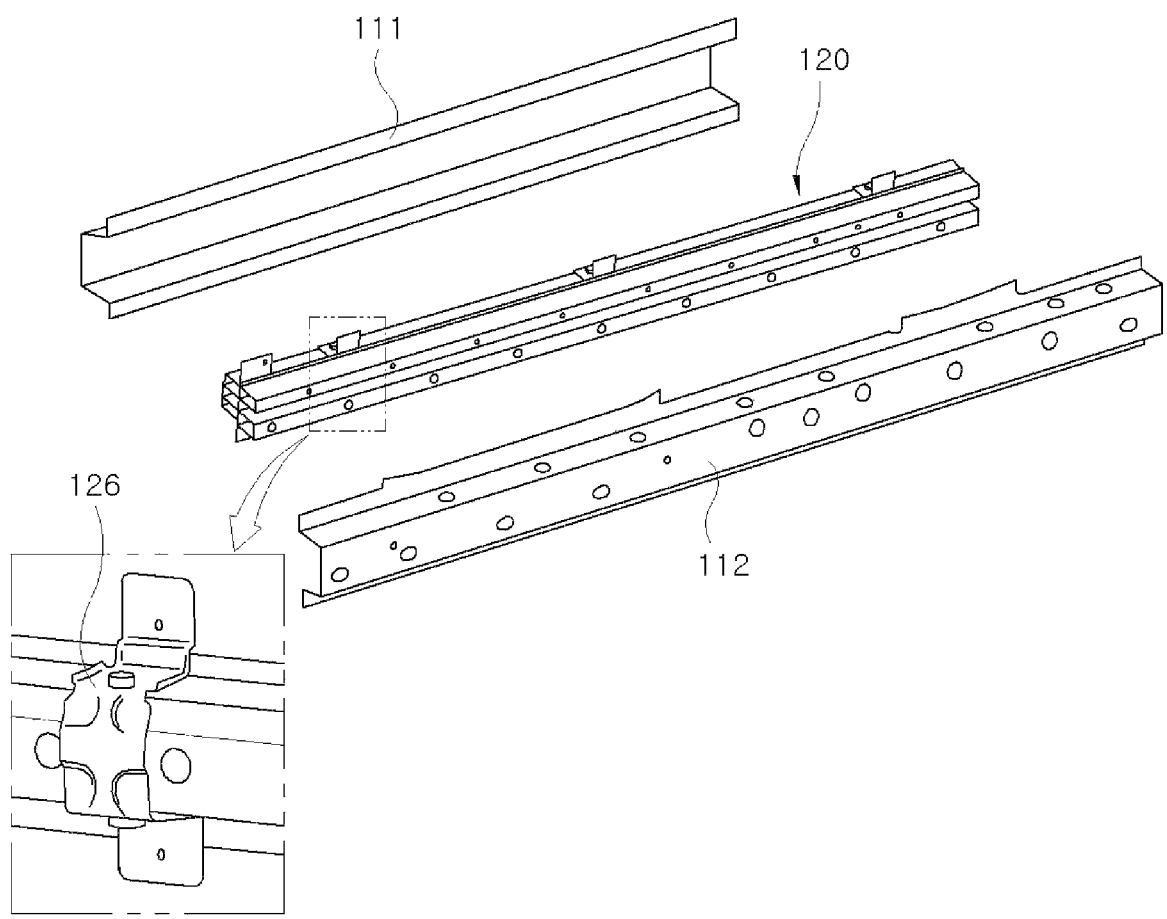
FIG. 3 is an exploded perspective diagram illustrating a side sill and a side sill reinforcement member according to still another example of the related art.
Figure 4:
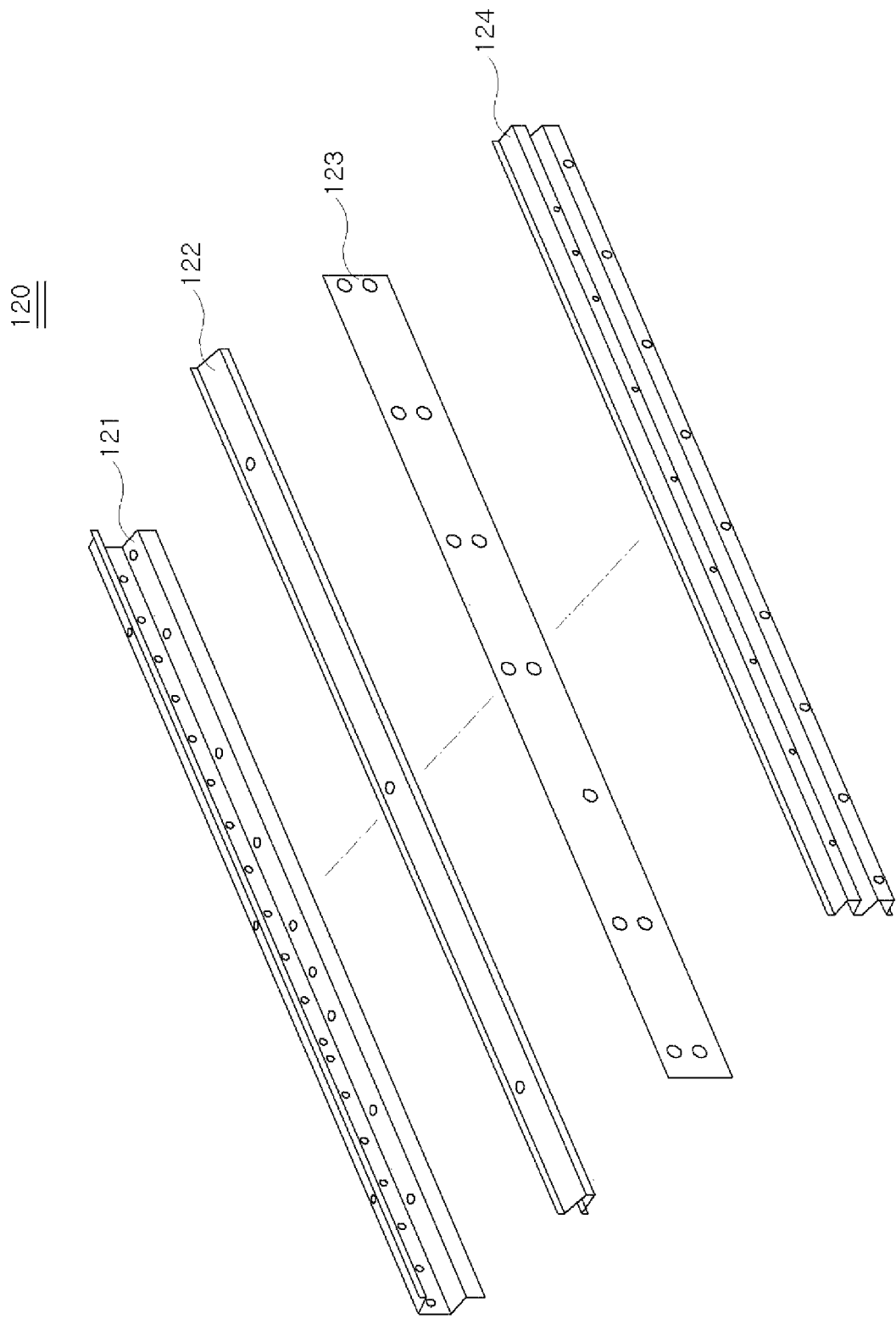
FIG. 4 is an exploded perspective diagram illustrating the side sill reinforcement member illustrated in FIG. 3.
Figure 5:
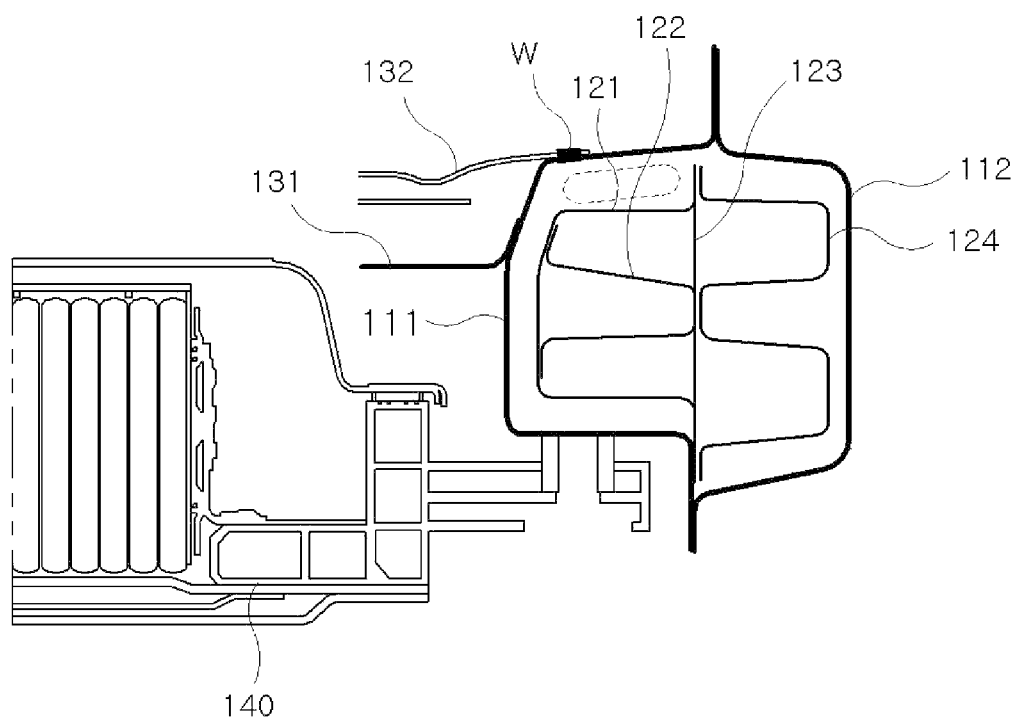
FIG. 5 is a cross-sectional diagram illustrating a portion on which the side sill according to still another example of the related art is mounted.
Figure 6:
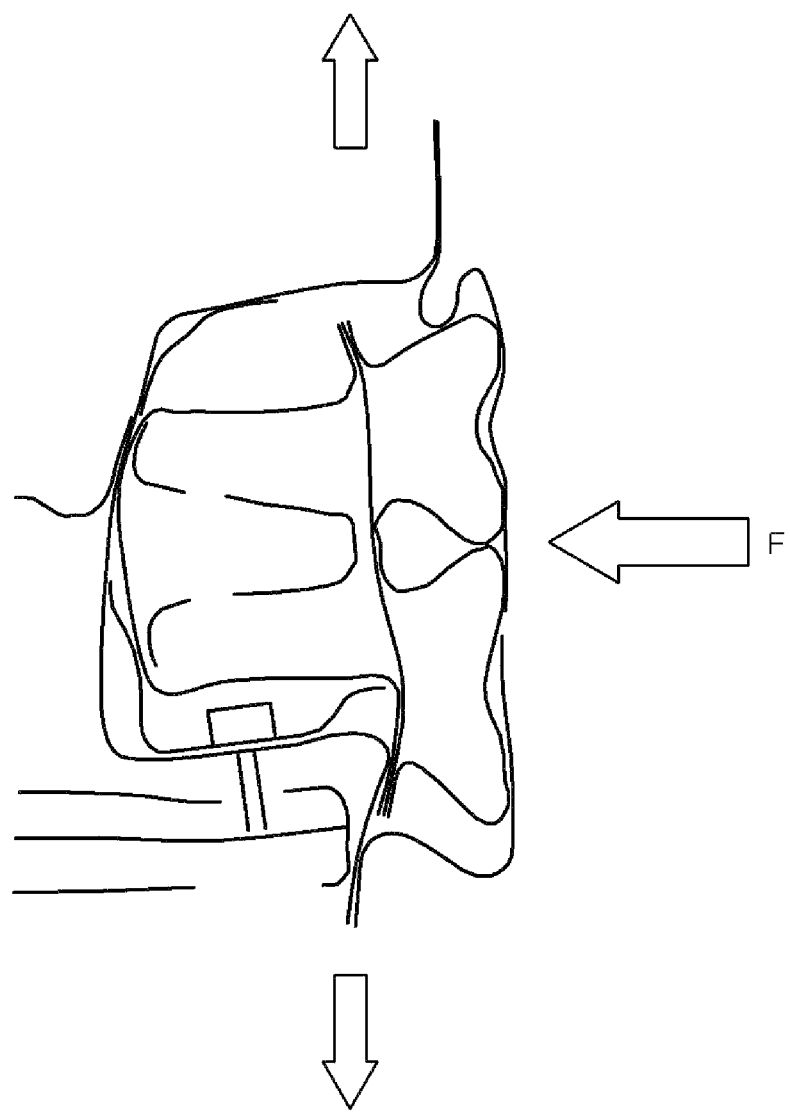
FIG. 6 is a cross-sectional diagram illustrating a state where a shocking force is applied to a portion on which the side sill according to still another example of the related art is mounted.
Figure 7:
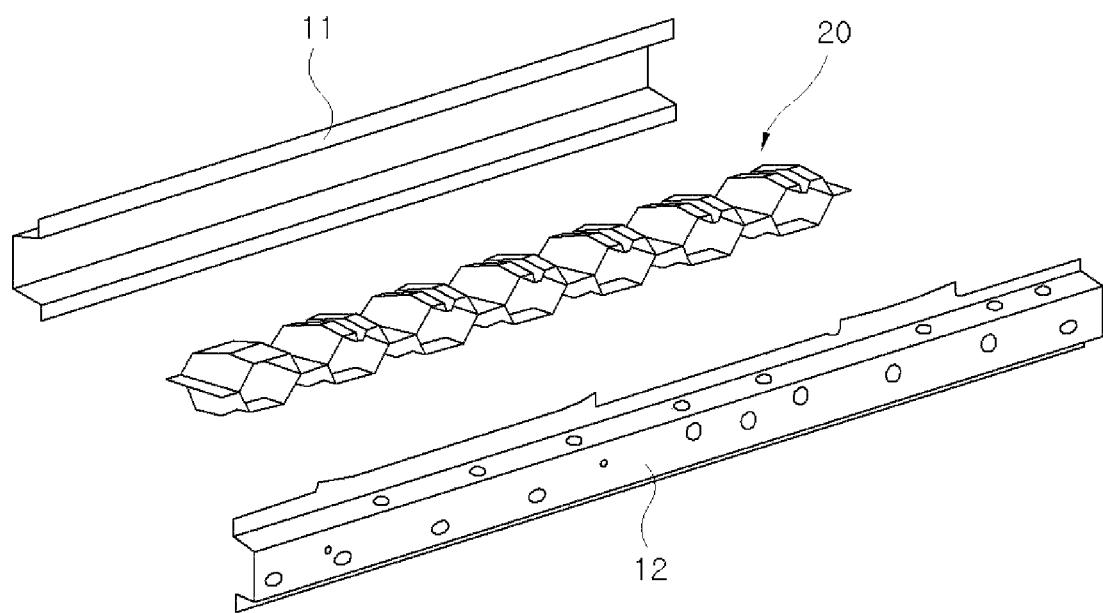
FIG. 7 is an exploded perspective diagram illustrating a side sill and a side sill reinforcement member configuring a side sill rigidity reinforcement structure of a vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a side sill rigidity reinforcement structure for a vehicle according to the present disclosure will be described in detail with reference to the accompanying drawings.

A side sill rigidity reinforcement structure for a vehicle according to one form of the present disclosure includes: a side sill inner 11, a side sill outer 12 disposed outside the side sill inner 11 and bonded to the side sill inner 11, and a side sill reinforcement member 20 installed in a space between the side sill inner 11 and the side sill outer 12, and the side sill reinforcement member 20 has a portion having a closed section formed to penetrate in the width direction of a vehicle and repeatedly formed in the longitudinal direction of the vehicle.

The side sill 10 is formed by bonding the side sill inner 11 convex to the inside of a vehicle and the upper end and lower end of the side sill outer 12 convex to the outside of the vehicle.

Reviewing the cross section, the side sill inner 11 includes an upper surface portion 11a, a vertical portion 11b extending downward from the end of the upper surface portion 11a, and a lower surface portion 11c extending from the end of the vertical portion 11b, and an upper bonding portion 11d and a lower bonding portion 11e formed in a form of being convex to the inside of the vehicle are formed on the upper surface portion 11a and the lower surface portion 11c, respectively, for bonding with the side sill outer 12.

Reviewing the cross section, the side sill outer 12 includes an upper surface portion 12a, a vertical portion 12b, and a lower surface portion 12c as in the side sill inner 11, and is formed to be convex to the opposite direction of the side sill inner 11, that is, the outside of the vehicle. The side sill outer 12 is also formed with an upper bonding portion 12d and a lower bonding portion 12e for bonding with the side sill inner 11.

The side sill reinforcement member 20 is installed in a space between the side sill inner 11 and the side sill outer 12 to reinforce the strength of the side sill 10 to improve a support force by a shocking force (F) upon side collision, thereby preventing the breakage of a high voltage battery 40 mounted on the side sill 10 and a center floor panel 31. One of the purposes of applying the side sill reinforcement member 20 is to prevent the breakage of the high voltage battery 40. Such a side sill reinforcement member may be used in a hybrid vehicle or an electric vehicle to mount the high voltage battery 40 on the side sill reinforcement member.

In order to reinforce the strength of the side sill 10, the side sill reinforcement member 20 has a plurality of portions each having a closed section formed to penetrate in the width direction of the vehicle, and the portions are repeatedly formed in the longitudinal direction of the vehicle. The inside of the side sill 10 has a cylindrical structure having the axis in the width direction of the vehicle by the side sill reinforcement member 20, such that the cylindrical structure reinforces the rigidity of the side sill 10.

To this end, the side sill reinforcement member 20 includes an upper reinforcement member 21 bonded to at least any one of the inside surface of the upper surface portion 11a of the side sill inner 11 and the inside surface of the upper surface portion 12a of the side sill outer 12, and a lower reinforcement member 22 bonded to at least any one of the inside surface of the lower surface portion 11c of the side sill inner 11 and the inside surface of the lower surface portion 12c of the side sill outer 12.

The upper reinforcement member 21 and the lower reinforcement member 22 have convex portions and concave portions repeatedly formed in the longitudinal direction of the vehicle, respectively, and are bonded to the side sill inner 11 or the side sill outer 12. In addition, the upper reinforcement member 21 and the lower reinforcement member 22 are bonded at an interval from each other. The upper reinforcement member 21 and the lower reinforcement member 22 form the portion having the closed section formed to penetrate in the width direction of the vehicle by such a structure.

The upper reinforcement member 21 includes a plurality of upper side sill bonding portions 21a convexly formed to be bonded to at least any one of the inside of the upper surface portion 11a of the side sill inner 11 and the inside of the upper surface portion 12a of the side sill outer 12, and a lower end bonding portion 21b formed between two upper side sill bonding portions 21a adjacent to each other, and a connection portion 21c for connecting the upper side sill bonding portion 21a to the lower end bonding portion 21b.

A plurality of upper side sill bonding portions 21a are formed at intervals in the longitudinal direction of the vehicle. Since the upper side sill bonding portions 21a is convexly formed, the upper side sill bonding portion 21a is bonded to at least any one of the inside of the upper surface portion 11a of the side sill inner 11 and the inside of the upper surface portion 12a of the side sill outer 12 by welding. In one form, the upper side sill bonding portion 21a is bonded to the inside of the upper surface portion 11a of the side sill inner 11.

The upper surface of the upper side sill bonding portion 21a is formed to contact the inside of the upper surface portion 11a of the side sill inner 11 and the inside of the upper surface portion 12a of the side sill outer 12.

Figure 9A:
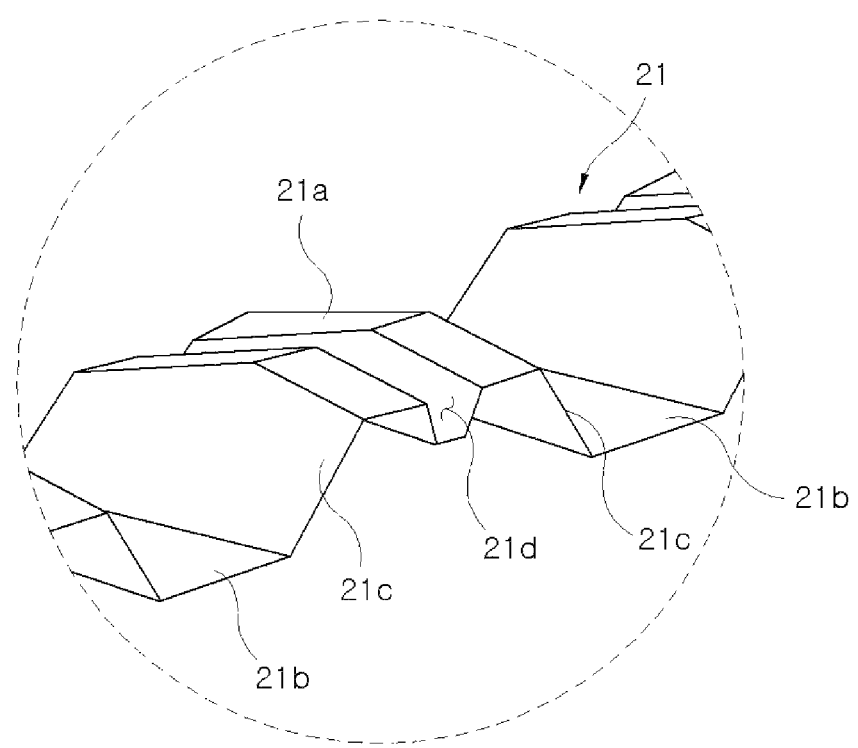
FIGS. 9A and 9B are enlarged perspective diagrams illustrating portions A, B illustrated in FIG. 8.
Figure 9B:
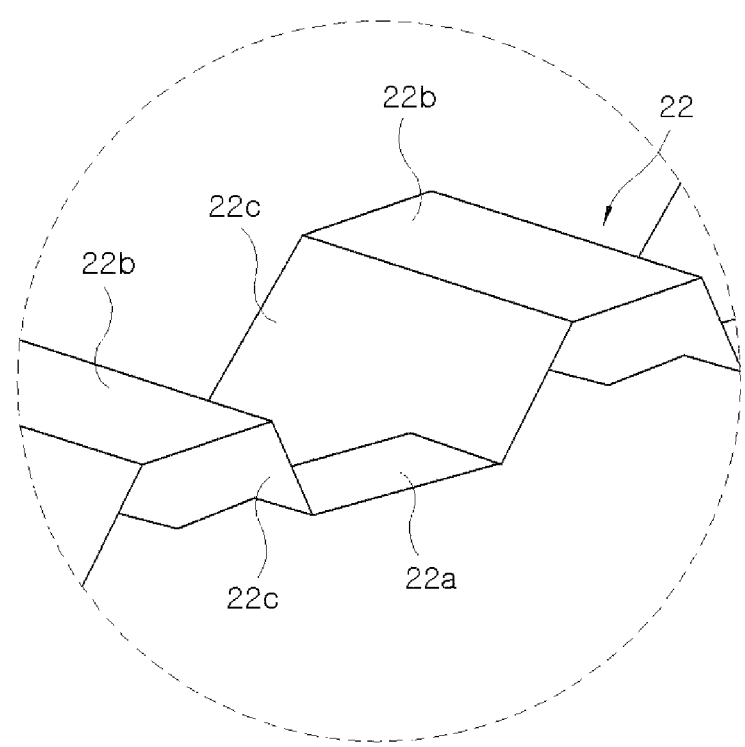

In addition, the upper side sill bonding portion 21a is formed obliquely in the width direction of the vehicle such that the upper surface of the upper side sill bonding portion 21a is in close contact with the inside of the upper surface portion 11a of the side sill inner 11 and the inside of the upper surface portion 12a of the side sill outer 12. Particularly, as illustrated in FIG. 9A, the upper side sill bonding portion 21a is formed to be inclined upward by a predetermined distance from the end adjacent to the widthwise outside of the vehicle so as to be in close contact with the inside of the upper surface portion 12a of the side sill outer 12, and after the predetermined distance, formed to be inclined downward so as to be in close contact with the inside of the upper surface portion 11a of the side sill inner 11.

When the upper side sill bonding portion 21a is welded to the inside of the upper surface portion 11a of the side sill inner 11, the end of a seat cross member 32 is located on the outside of the upper surface portion 11a of the side sill inner 11, such that the seat cross member 32, the side sill inner 11, and the upper reinforcement member 21 are welded at once. Therefore, the seat cross member is connected to the upper reinforcement member 21 without disconnection, thereby preventing a decrease in rigidity by the structural disconnection.

The lower end bonding portion 21b is formed lower than the upper side sill bonding portion 21a between the upper side sill bonding portions 21a adjacent to each other. Compared to the upper side sill bonding portion 21a convexly formed, the lower end bonding portion 21b is concavely formed. In addition, a plurality of upper side sill bonding portions 21a and a plurality of lower end bonding portions 21b are formed alternately in the longitudinal direction of the vehicle.

The connection portion 21c connects the upper side sill bonding portion 21a to the lower end bonding portion 21b. The connection portion 21c is obliquely formed to connect the upper side sill bonding portion 21a and the lower end bonding portion 21b adjacent to each other.

Meanwhile, the upper side sill bonding portion 21a is formed with a strength reinforcement groove 21d formed at a predetermined depth in the width direction of the vehicle. The strength reinforcement groove 21d is formed in the width direction of the vehicle, thereby improving the cross-sectional strength of the upper side sill bonding portion 21a.

Figure 8:
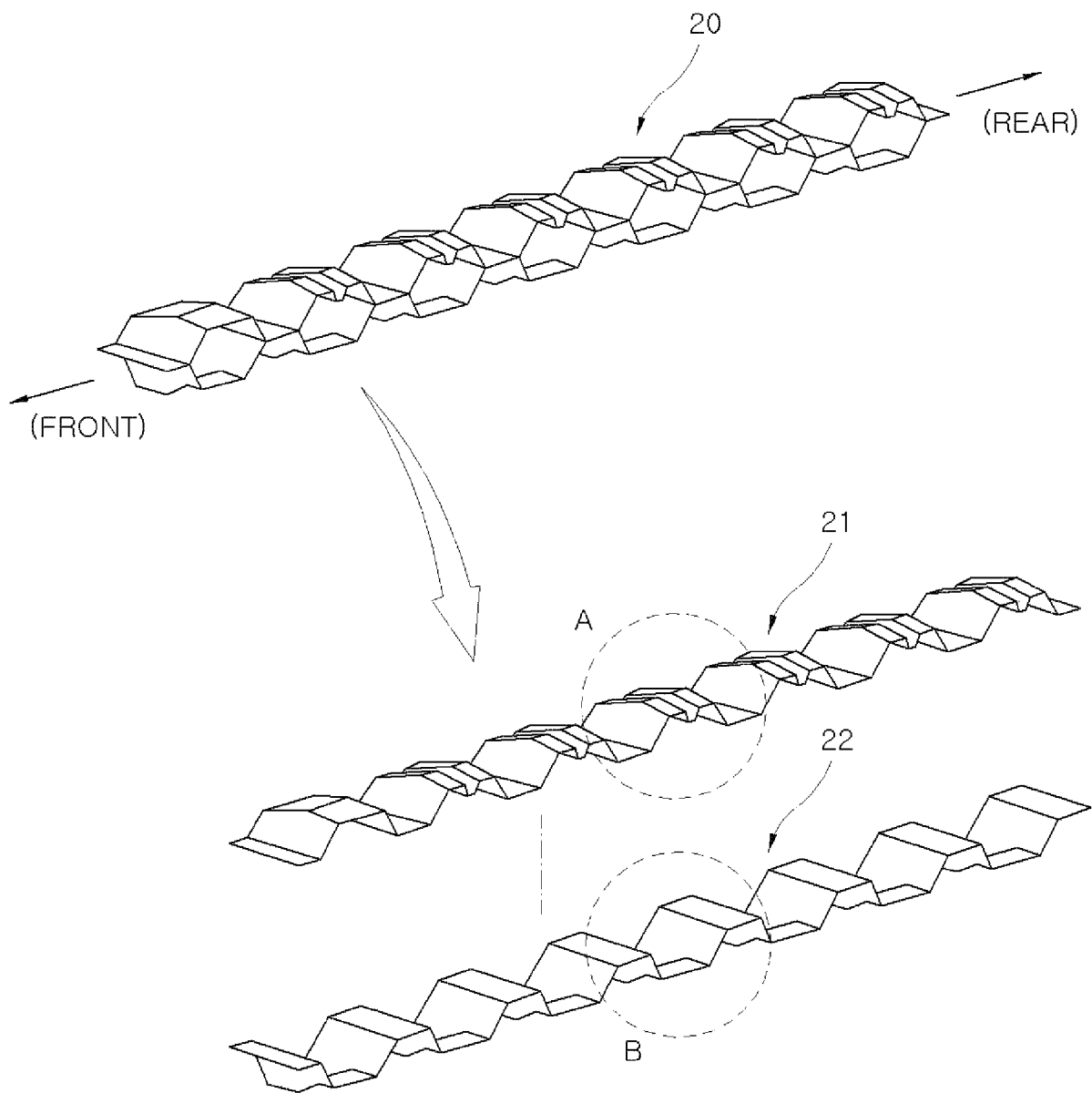
FIG. 8 is an exploded perspective diagram illustrating the side sill reinforcement member according to the exemplary form of the present disclosure.

Here, the strength reinforcement groove 21d may be formed on all of the plurality of upper side sill bonding portions 21a, or some of the upper side sill bonding portions 21a. In one form, as illustrated in FIG. 8, the strength reinforcement groove 21d is formed on the remaining upper side sill bonding portion 21a other than the upper side sill bonding portion 21a located at the forefront in the longitudinal direction of the vehicle among the plurality of upper side sill bonding portions 21a.

The lower reinforcement member 22 includes a plurality of lower side sill bonding portion 22a concavely formed to contact at least any one of the inside of the lower surface portion 11c of the side sill inner 11 and the inside of the lower surface portion 12c of the side sill outer 12, an upper end bonding portion 22b formed between two lower side sill bonding portions 22a adjacent to each other, and a connection portion 22c for connecting the lower side sill bonding portion 22a to the upper end bonding portion 22b.

A plurality of lower side sill bonding portions 22a are formed at intervals in the longitudinal direction of the vehicle. Since the lower side sill bonding portion 22a is concavely formed, the lower side sill bonding portion 22a is bonded to at least any one of the inside of the lower surface portion 11c of the side sill inner 11 and the inside of the lower surface portion 12c of the side sill outer 12 by welding. The lower side sill bonding portion 22a is bonded to the inside of the lower surface portion 11c of the side sill inner 11.

The lower side sill bonding portion 22a is located below the upper side sill bonding portion 21a to be spaced apart from the upper side sill bonding portion 21a.

Figure 10:
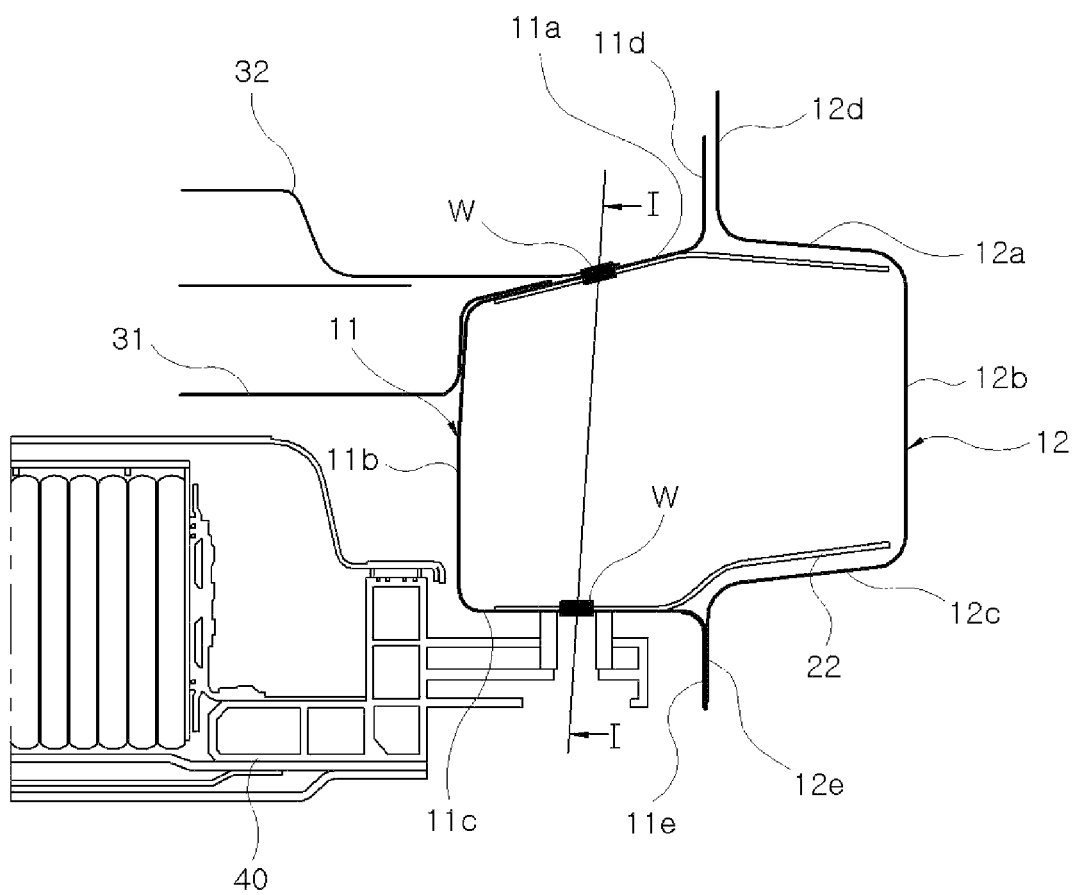
FIG. 10 is a cross-sectional diagram illustrating the side sill rigidity reinforcement structure for a vehicle according to one exemplary form of the present disclosure.
Figure 11:
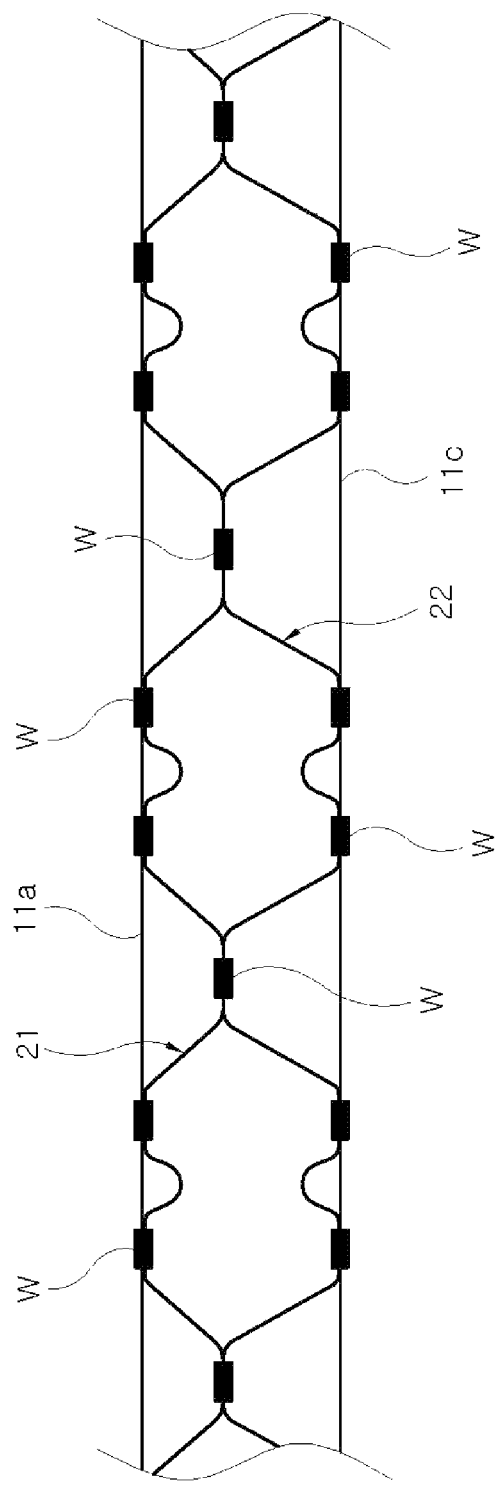
FIG. 11 is a cross-sectional diagram taken along the line I-I illustrated in FIG. 10 in order to illustrate a state where the side sill reinforcement member in one form of the present disclosure is welded on the side sill.
Figure 12:
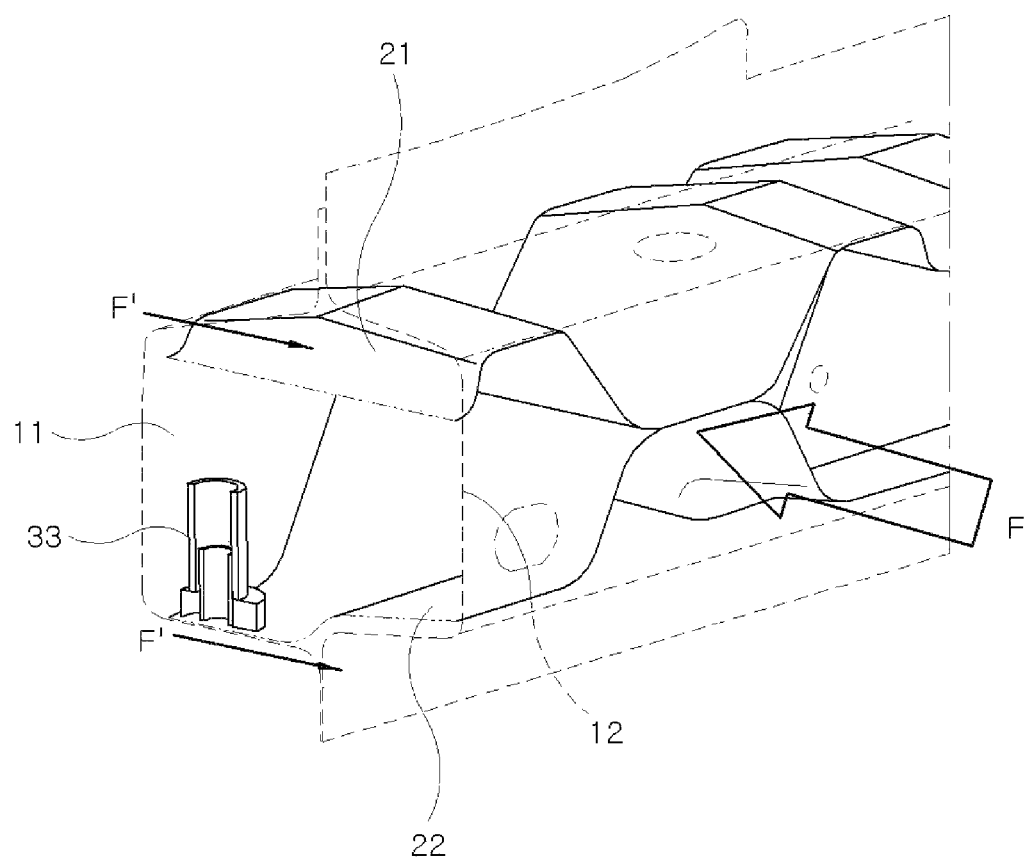
FIG. 12 is a perspective diagram illustrating a state where a shocking force is applied to the side sill rigidity reinforcement structure for a vehicle according to one exemplary form of the present disclosure.

The lower side sill bonding portion 22a may be formed to be stepped in the width direction of the vehicle (see FIGS. 10 and 12). The lower side sill bonding portion 22a is formed to be stepped, such that the lower side sill bonding portion 22a is in close contact with the inside of the lower surface portion 11c of the side sill inner 11 and the inside of the lower surface portion 12c of the side sill outer 12. Particularly, the lower side sill bonding portion 22a may be formed to be stepped such that the portion adjacent to the widthwise outside of the vehicle is formed higher than the portion adjacent to the widthwise inside of the vehicle.

The lower side sill bonding portion 22a is bonded to the lower surface portion 11c of the side sill inner 11, such that the side sill inner 11 and the lower side sill bonding portion 22a may be integrally formed, thereby improving rigidity.

The upper end bonding portion 22b is formed higher than the lower side sill bonding portion 22a between the lower side sill bonding portions 22a adjacent to each other. The lower side sill bonding portion 22a is concavely formed, but the upper end bonding portion 22b is convexly formed, and a plurality of lower side sill bonding portions 22a and a plurality of upper end bonding portions 22b are formed alternately in the longitudinal direction of the vehicle. In addition, the upper surface of the upper end bonding portion 22b is bonded to the lower surface of the lower end bonding portion 21b by welding. The upper surface of the upper end bonding portion 22b and the lower surface of the lower end bonding portion 21b are formed in a plane, respectively to be bonded by welding in the state of contacting each other.

The connection portion 22c connects the lower side sill bonding portion 22a to the upper end bonding portion 22b. The connection portion 22c is obliquely formed to connect the lower side sill bonding portion 22a and the upper end bonding portion 22b adjacent to each other.

The portion in which the lower reinforcement member 22 and the lower surface portion 11c of the side sill inner 11 are bonded may have a fastening bolt 33 for mounting the high voltage battery 40 fastened therethrough.

A region surrounded by the upper side sill bonding portion 21a of the upper reinforcement member 21, the connection portion 21c of the upper reinforcement member 21, the lower side sill bonding portion 22a of the lower reinforcement member 22, and the connection portion 22c of the lower reinforcement member 22 has a cylindrical structure penetrating in the width direction of the vehicle, thereby improving rigidity.

In addition, a region surrounded by the upper surface portion 11a of the side sill inner 11, the lower end bonding portion 21b, and the connection portion 21c of the upper reinforcement member 21 also has a cylindrical structure, and a region surrounded by the lower surface portion 11c of the side sill inner 11, the upper end bonding portion 22b, and the connection portion 22c of the lower reinforcement member 22 also has a cylindrical structure, thereby improving rigidity.

Therefore, upon side collision of a vehicle, it is possible to reduce the deformation of the side sill 10 by the improved rigidity, thereby preventing the passenger's injury and preventing the breakage of the high voltage battery 40 installed below the center floor panel 31.

That is, referring to FIG. 12, even if the shocking force (F) is transferred to the side of the vehicle by the side collision, the rigidity of the side sill 10 is improved by a reaction force (F') supporting the shocking force (F) through the upper portion and lower portion of the side sill reinforcement member 20.

The upper reinforcement member 21 and the lower reinforcement member 22 configuring the side sill reinforcement member 20 are made of a steel material. Particularly, the upper reinforcement member 21 and the lower reinforcement member 22 are manufactured by a hot stamping method, thereby improving rigidity. The hot stamping method is a method for press-molding and rapidly cooling the material heated at high temperature to manufacture an ultra high tensile steel or component with a remarkably high strength by the quench hardening effect. The upper reinforcement member 21 and the lower reinforcement member 22 are made of steel, thereby saving the cost, and are processed by the hot stamping, thereby achieving the purposes of reducing the weight and improving rigidity.

Figure 13:
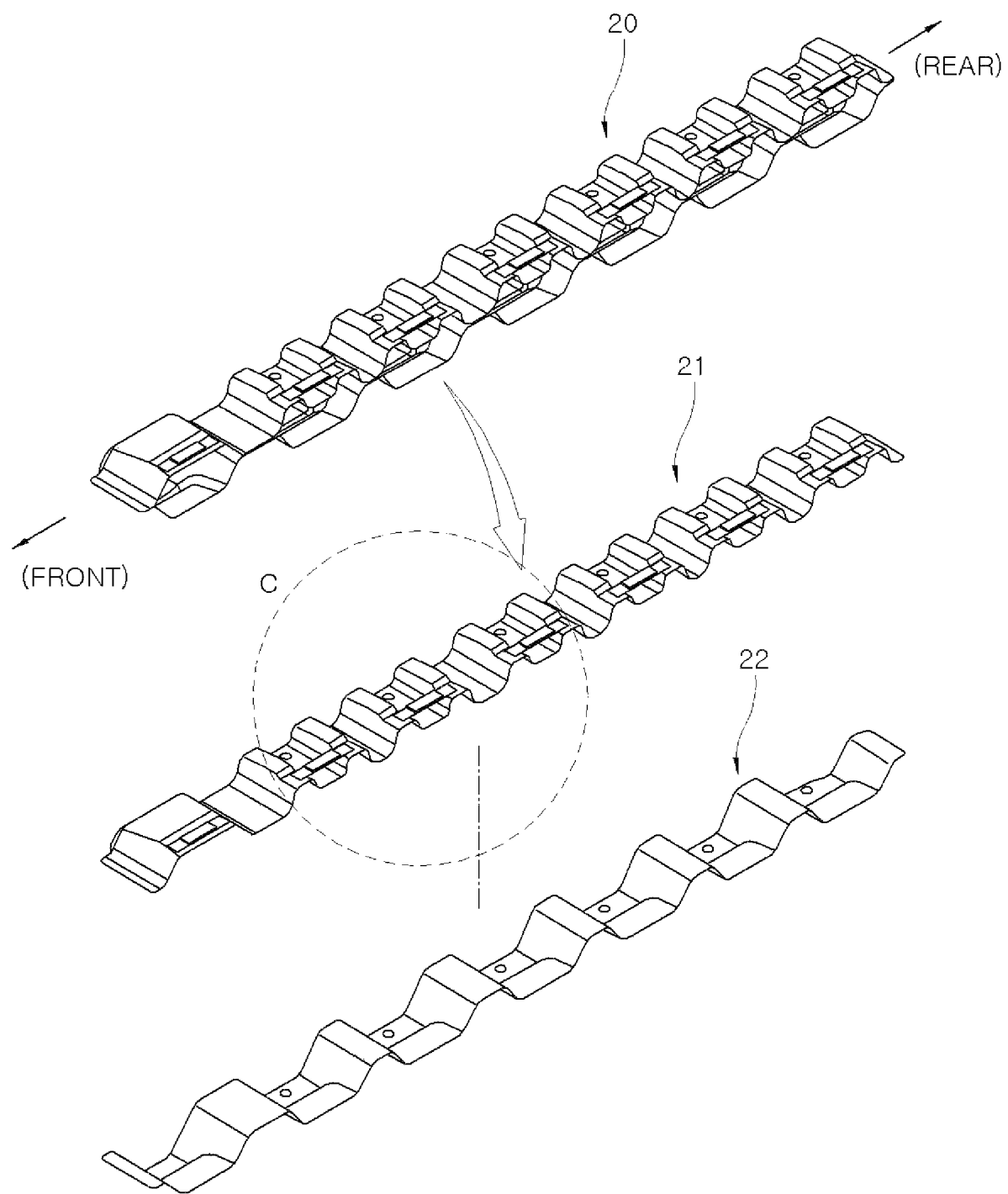
FIG. 13 is an exploded perspective diagram illustrating a side sill reinforcement member according to another exemplary form of the present disclosure.
Figure 14:
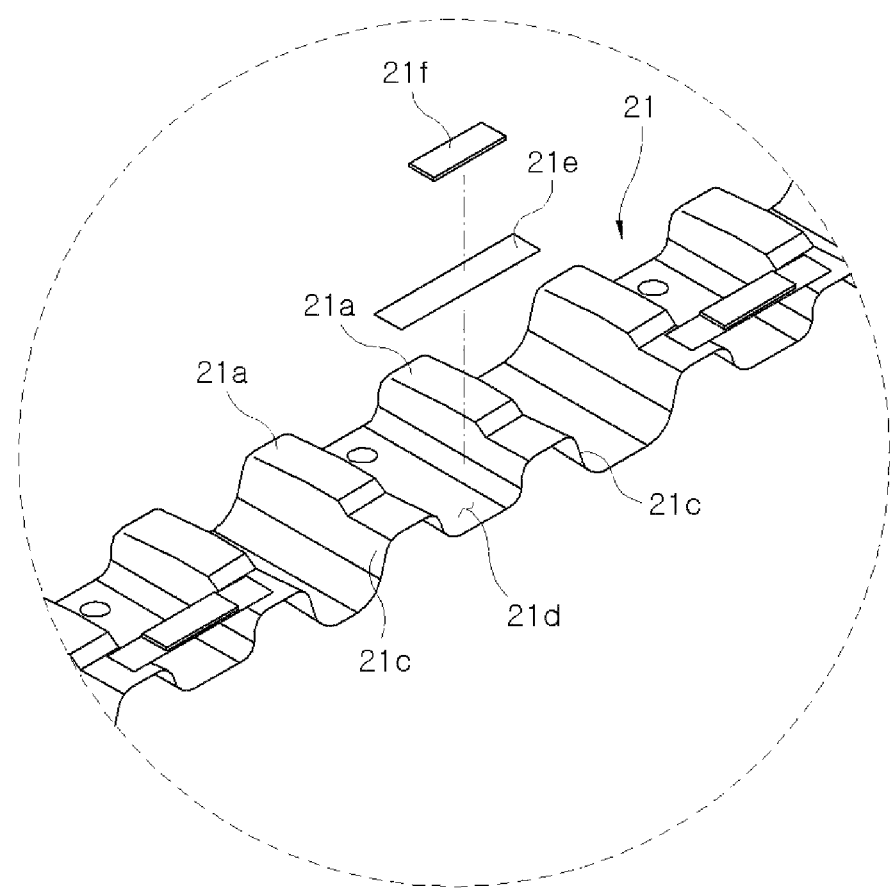
FIG. 14 is an enlarged perspective diagram illustrating a portion C illustrated in FIG. 8.
Figure 15:
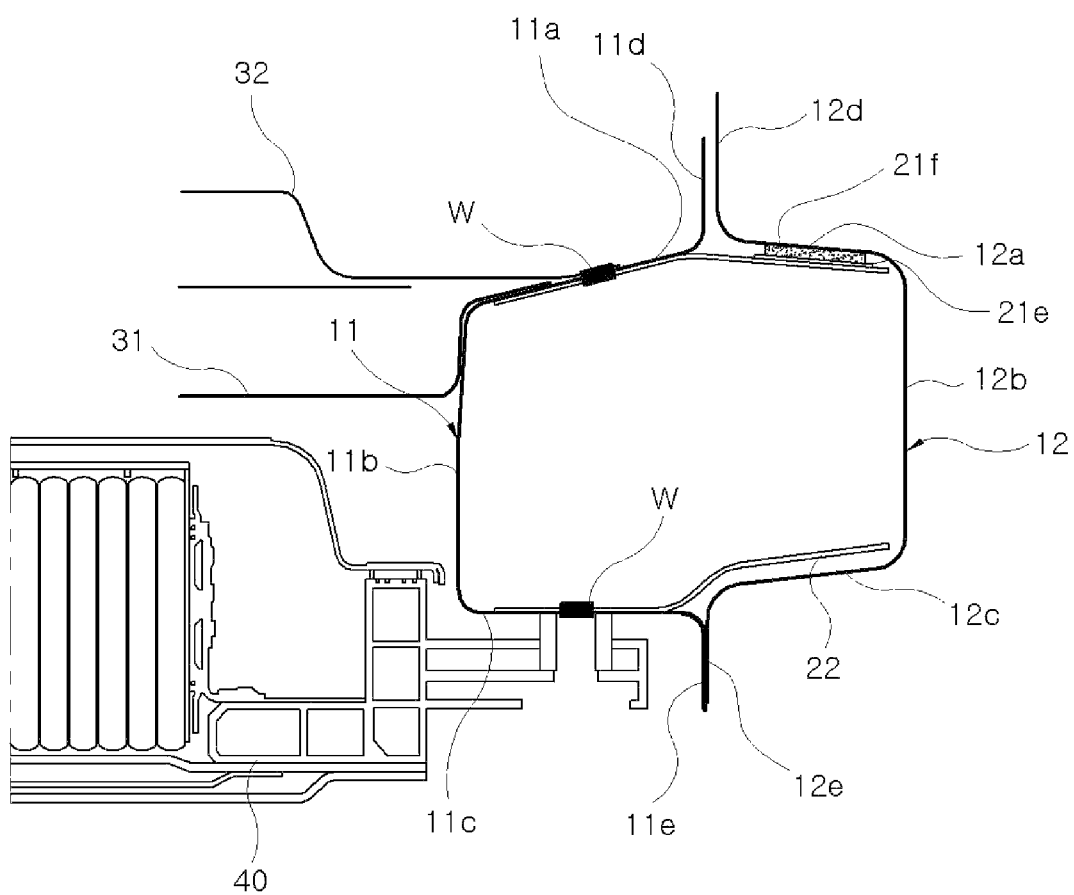
FIG. 15 is a cross-sectional diagram illustrating the side sill rigidity reinforcement structure for a vehicle according to another exemplary form of the present disclosure.

Meanwhile, FIGS. 13 to 15 illustrate a side sill rigidity reinforcement structure for a vehicle according to another exemplary form of the present disclosure.

FIGS. 13 and 14 illustrate the side sill reinforcement member 20 applied to the present exemplary form.

The side sill reinforcement member 20 according to the present exemplary form includes the upper reinforcement member 21 and the lower reinforcement member 22, and the shape thereof is similar to the upper reinforcement member 21 and the lower reinforcement member 22 according to the aforementioned exemplary form.

That is, the upper reinforcement member 21 includes the plurality of upper side sill bonding portions 21a convexly formed to be bonded to at least any one of the inside of the upper surface portion 11a of the side sill inner 11 and the inside of the upper surface portion 12a of the side sill outer 12, the lower end bonding portion 21b formed between two upper side sill bonding portions 21a adjacent to each other, and the connection portion 21c for connecting the upper side sill bonding portion 21a to the lower end bonding portion 21b. However, in the present exemplary form, the strength reinforcement groove 21d may be formed larger in depth and width than the strength reinforcement groove 21d according to the aforementioned exemplary form to have the form in which the upper side sill boding portion 21a is formed on both sides of the strength reinforcement groove 21d, respectively.

The lower reinforcement member 22 includes the plurality of lower side sill bonding portions 22a concavely formed to be bonded to at least any one of the inside of the lower surface portion 11c of the side sill inner 11 and the inside of the lower surface portion 12c of the side sill outer 12, the upper end bonding portion 22b formed between two lower side sill bonding portions 22a adjacent to each other, and the connection portion 22c for connecting the lower side sill bonding portion 22a to the upper end bonding portion 22b.

Meanwhile, the present exemplary form further includes a bracket 21e and a foaming member 21f on the upper surface of the upper side sill bonding portion 21a.

The bracket 21e is installed to connect the upper side sill bonding portions 21a spaced apart from each other. A plurality of brackets 21e are installed in the longitudinal direction of the upper reinforcement member 21.

The bracket 21e is installed such that both ends thereof connect the upper side sill bonding portions 21a spaced apart from each other. In one form, the bracket 21e is installed to connect two upper side sill bonding portions 21a with the strength reinforcement groove 21d interposed therebetween.

However, since the upper side sill bonding portion 21a located at the forefront among the upper side sill bonding portions 21a is not formed with the strength reinforcement groove 21d, the bracket 21e is bonded to the upper surface of the upper side sill bonding portion 21a.

The bracket 21e is bonded to the upper side sill bonding portion 21a to be located below the upper surface portion 12a of the side sill outer 12 in the upper side sill bonding portion 21a.

Here, the bracket 21e may be bonded to the upper side sill bonding portion 21a by welding.

The foaming member 21f is provided on the upper surface of the bracket 21e. The foaming member 21f is foamed in a foam form to increase the volume, thereby filling a gap between the upper reinforcement member 21 and the side sill outer 12. When a vehicle body enters a painting process and is heated to the high temperature, the foaming member 21f is heated and foamed. The foamed foaming member 21f fills the gap between the upper reinforcement member 21 and the side sill outer 12, and contacts the bottom surface of the upper surface portion 12a of the side sill outer 12 to strengthen the coupling force between the side sill outer 12 and the side sill reinforcement member 20, thereby improving strength to reduce the deformation of the side sill 10 upon side collision.

The foaming member 21f may also be bonded to the upper surface of the bracket 21e through an adhesive agent, an adhesive tape, or the like. Alternatively, the foaming member 21f may also be integrally formed with the bracket 21e upon molding of the bracket 21e.

What is claimed is:

1. A side sill rigidity reinforcement structure for a vehicle, the side sill rigidity reinforcement structure comprising:
a side sill inner;
a side sill outer disposed outside the side sill inner and bonded to the side sill inner; and
a side sill reinforcement member installed in a space between the side sill inner and the side sill outer,
wherein the side sill reinforcement member comprises a plurality of portions each having a closed section formed to penetrate in a width direction of the vehicle, and portions of the plurality of portions are repeatedly formed in a longitudinal direction of the vehicle,
wherein the side sill reinforcement member further comprises:
an upper reinforcement member bonded to at least one of an inside surface of an upper surface portion of the side sill inner or an inside surface of the upper surface portion of the side sill outer,
wherein the upper reinforcement member is formed with a plurality of upper side sill bonding portions at intervals therebetween, and each upper side sill bonding portion is convexly formed to be bonded to at least one of the inside surface of the upper surface portion of the side sill inner or the inside surface of the upper surface portion of the side sill outer, wherein a strength reinforcement groove formed at a predetermined depth in the width direction of the vehicle is formed in at least one upper side sill bonding portion of the plurality of upper side sill bonding portions, and wherein the upper side sill bonding portion is formed to be inclined upward by a first predetermined distance along the width direction from an end adjacent to a widthwise outside of the vehicle, and after the first predetermined distance, formed to be inclined downward by a second predetermined distance along the width direction.

2. The side sill rigidity reinforcement structure of claim 1, wherein the side sill reinforcement member further comprises:

a lower reinforcement member bonded to at least one of an inside surface of a lower surface portion of the side sill inner or an inside surface of a lower surface portion of the side sill outer, and wherein the upper reinforcement member and the lower reinforcement member are bonded at intervals therebetween to have the closed section formed to penetrate in the width direction of the vehicle.

3. The side sill rigidity reinforcement structure of claim 2, wherein the lower reinforcement member is formed with a plurality of lower side sill bonding portions at intervals therebetween, and bonded to the upper reinforcement member, and each the lower side sill bonding portion is concavely formed to be bonded to at least one of the inside surface of the lower surface portion of the side sill inner or the inside surface of the lower surface portion of the side sill outer.

4. The side sill rigidity reinforcement structure of claim 3, wherein the upper reinforcement member is formed with a lower end bonding portion formed lower than the upper side sill bonding portion between the upper side sill bonding portions adjacent to each other, wherein the lower reinforcement member is formed with an upper end bonding portion formed higher than the lower side sill bonding portion between the lower side sill bonding portions adjacent to each other and bonded to the lower end bonding portion, wherein the lower end bonding portion is formed alternately with the upper side sill bonding portion in the upper reinforcement member, and wherein the upper end bonding portion is formed alternately with the lower side sill bonding portion in the lower reinforcement member.

5. The side sill rigidity reinforcement structure of claim 4, wherein the lower side sill bonding portion is located to be spaced apart from the lower portion of the upper side sill bonding portion.

6. The side sill rigidity reinforcement structure of claim 4, wherein a connection portion for connecting the upper side sill bonding portion to the lower end bonding portion is formed in the upper reinforcement member, and wherein another connection portion for connecting the lower side sill bonding portion to the upper end bonding portion is formed in the lower reinforcement member.

7. The side sill rigidity reinforcement structure of claim 6, wherein the connection portion of the upper reinforcement member and the connection portion of the lower reinforcement member are obliquely formed.

8. The side sill rigidity reinforcement structure of claim 6, wherein a region surrounded by the upper side sill bonding portion of the upper reinforcement member, the connection portion of the upper reinforcement member, the lower side sill bonding portion of the lower reinforcement member, and the connection portion of the lower reinforcement member is formed in a cylindrical shape penetrating in the width direction of the vehicle.

9. The side sill rigidity reinforcement structure of claim 3, wherein the lower side sill bonding portion is formed to be stepped so that a portion adjacent to a widthwise outside of the vehicle is formed higher than a portion adjacent to a widthwise inside of the vehicle.

10. The side sill rigidity reinforcement structure of claim 3, wherein the upper side sill bonding portion is bonded to the inside of the upper surface of the side sill inner by welding, and wherein the lower side sill bonding portion is bonded to the inside of the lower surface of the side sill inner by welding.

11. The side sill rigidity reinforcement structure of claim 3, wherein a portion in which the upper side sill bonding portion is welded to the inside surface of the upper surface of the side sill inner is welded together with an end of a seat cross member.

12. A side sill rigidity reinforcement structure for a vehicle, the side sill rigidity reinforcement structure comprising:

a side sill inner;

a side sill outer disposed outside the side sill inner and bonded to the side sill inner; and a side sill reinforcement member installed in a space between the side sill inner and the side sill outer, wherein the side sill reinforcement member comprises a plurality of portions each having a closed section formed to penetrate in a width direction of the vehicle, and portions of the plurality of portions are repeatedly formed in a longitudinal direction of the vehicle, wherein the side sill reinforcement member further comprises:

an upper reinforcement member bonded to at least one of an inside surface of an upper surface portion of the side sill inner or an inside surface of the upper surface portion of the side sill outer, and wherein the upper reinforcement member is formed with a plurality of upper side sill bonding portions at intervals therebetween, and each upper side sill bonding portion is convexly formed to be bonded to at least one of the inside surface of the upper surface portion of the side sill inner or the inside surface of the upper surface portion of the side sill outer;

a bracket installed to connect two upper side sill bonding portions adjacent to each other; and a foaming member provided on the upper surface of the bracket.

13. The side sill rigidity reinforcement structure of claim 12, wherein the bracket is installed to connect the two upper side sill bonding portions with a strength reinforcement groove formed at a predetermined depth in the width direction of the vehicle interposed therebetween to the upper side sill bonding portion.

14. The side sill rigidity reinforcement structure of claim 12, wherein a plurality of brackets are installed in the longitudinal direction of the upper reinforcement member.

15. The side sill rigidity reinforcement structure of claim 12,
wherein the bracket is installed on the upper side sill bonding portion in the portion located below the upper surface portion of the side sill outer in the upper side sill bonding portion.

16. The side sill rigidity reinforcement structure of claim 12,
wherein the foaming member is foamed by heating to fill a gap between the upper side sill bonding portion and the inside surface of the side sill outer.

17. The side sill rigidity reinforcement structure of claim 2,
wherein the upper reinforcement member and the lower reinforcement member are manufactured by processing a steel material by hot stamping.

* * * * *